Jan. 4, 1966    A. C. MONAGHAN    3,226,839
HEATING TUNNEL
Filed June 6, 1961    2 Sheets-Sheet 1

FIG. I

INVENTOR.
ALFRED C. MONAGHAN
BY
*March and Curtiss*
ATTORNEYS

Jan. 4, 1966   A. C. MONAGHAN   3,226,839
HEATING TUNNEL

Filed June 6, 1961   2 Sheets-Sheet 2

INVENTOR.
ALFRED C. MONAGHAN
BY
*March and Gertiss*
ATTORNEYS

3,226,839
HEATING TUNNEL
Alfred C. Monaghan, Stow, Mass., assignor to Serv-All Machinery Corp., Brooklyn, N.Y., a corporation of New Jersey
Filed June 6, 1961, Ser. No. 115,133
1 Claim. (Cl. 34—21)

The present invention relates to apparatus for and a method of applying heat by a current of air passing over or circulating around material transported through the apparatus. More particulary, it relates to the art of wrapping an article in a film of heat-shrinkable material and by the application of heat thereto shrinking a relatively loose wrapping of such material into one conforming intimately to the contour of the article encased therein.

There are many plastic films in use, made of materials such as polyethylene, rubber hydrohalide, vinylidine chloride resin, polystyrene, etc., which are fusible upon the application of heat and pressure thereto. Such films also possess, or may be formed to possess, the characteristic of being shrinkable axially or bi-axially in the presence of heat. These films have been found to make excellent wrappings for various articles because they are tough and easy to manipulate, transparent yet capable of receiving and holding a printed impression, and may be used to make a neat, attractive and hermetically sealed wrapping. However, they differ from one another in certain characteristics, one of which is that as between them they are not of the same texture and individually their texture is not uniform in the sense that a particular type of film has "weak spots" running throughout its structure. This characteristic is determinative of the maximum amount of heat to which the film may be subjected for a given period of time without rupturing, i.e., its limit of shrinkability.

Accordingly, with the foregoing in mind the present invention contemplates an improved apparatus for and method of applying heat to a film of material of the character described to shrink the film in forming a wrapping around an article. In its broader aspects, the present invention contemplates the provision of means for applying heat to the film by the circulation of a current of heated air therearound and, in the application of the heat, directing the current of air to apply heat of substantially equal intensity against each of two opposite sides only of the article encased in the film.

More specifically, the invention provides apparatus for transporting an article wrapped loosely in a sealed wrapping of heat-shrinkable film through a heating tunnel at a predetermined, uniform speed to subject the film to an application of heat for a given period of time. Air heated to the maximum temperature suitable for the particular film being used is adapted to be circulated in the heating tunnel around the article transported therethrough on a conveyor formed to support the film-encased article so that substantially the entire surface area of the film is exposed to the circulating air. The tunnel is formed to direct the heated air so as to apply heat of substantially equal maximum intensity to the film on each of two opposite sides only of the encased article, the remaining surfaces of the film on other sides of the article being subjected indirectly to the heat given off by the air circulating in the tunnel. In its transport through the tunnel, the leading edge of the film-encased article is first subjected to the heated air, whereby the heat is applied progressively along the film-encased article from the leading to the following edge thereof.

In the accompanying drawings, the invention has been shown merely by way of example and in preferred form and obviously many variations and modifications may be made therein and in its mode of application which will still be comprised within its spirit. It is to be understood, therefore, that the invention is not limited to any specific form as embodiment, except insofar as such limitations are set forth in the appended claims.

Referring to the drawings.

Figure 1:
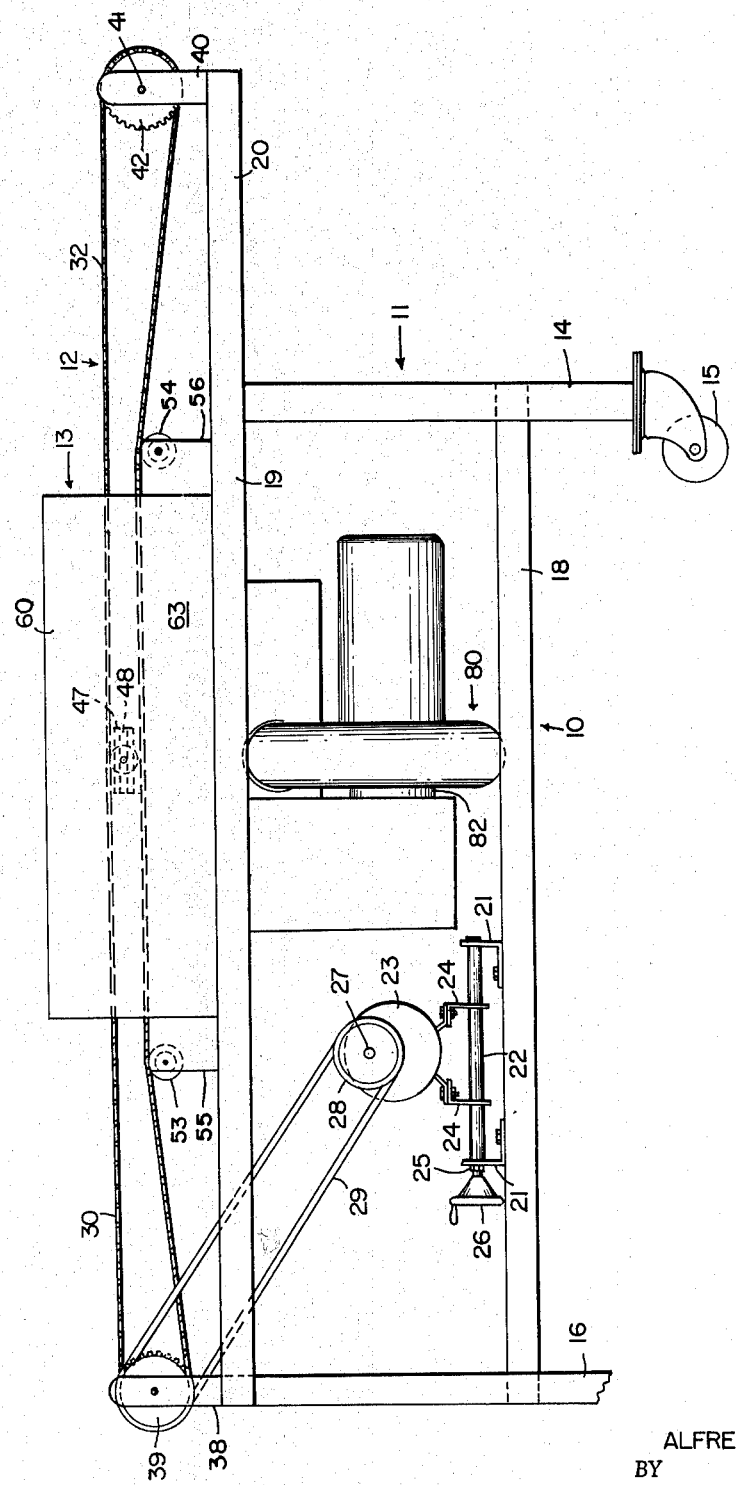
FIG. 1 is a side elevation of the heat applying apparatus.

In the preferred embodiment of the heat applying apparatus 10 shown in the drawings, the structure includes three main elements comprising a frame 11, which supports a conveyor 12 and a heating tunnel 13. The frame 11 is mobile so that the apparatus may be readily moved into association with other mechanisms such as an article-wrapping machine for conjoint and automatic operation therewith, or disassociated therefrom for use as an independent, hand-fed unit. To this end, the frame 11 (FIG. 1) comprises a pair of vertically disposed legs 14 (one leg only being shown) located at the forward or right-hand end of the frame and supported on casters 15. Similarly, two legs 16 (FIG. 2) equipped with fixed, flat bases 17 instead of casters are located at the rear or left-hand end of the machine. Thus the rear end of the machine may be lifted to raise the leg bases 17 out of contact with the floor upon which they normally rest and the entire apparatus wheeled on the casters 15 to position it in any desired location.

The legs 14 and 16 of the frame 11 are connected and supported near their lower ends by longitudinally and transversely extending cross beams 18 and at their upper ends by similarly disposed cross beams 19, the longitudinal beams 19 extending horizontally, as at 20, beyond the legs 14. Mounted on one of the beams 18 are two spaced-apart brackets 21 in which two slide rods 22 (one only being visible) are fixed for supporting an electric motor 23 mounted on slide brackets 24 arranged for reciprocating movement along the rods 22. Such movement is effected by a screw 25 journalled in the brackets 21 and having a threaded connection with the motor supporting brackets 24, the screw being turnable by a handwheel 26 to move the motor in either a forward or rearward direction as desired. Motor shaft 27 is equipped with a pulley 28 for running engagement with a friction drive belt 29.

Figure 2:
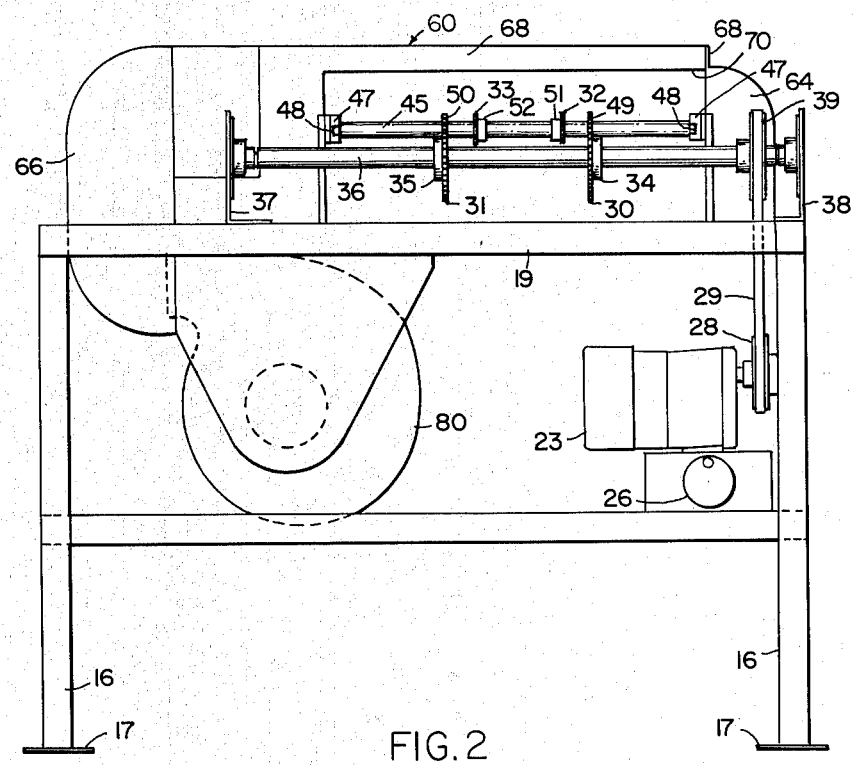
FIG. 2 is an end elevation of the apparatus, looking at the left-hand end of the structure shown in FIG. 1.
Figure 3:
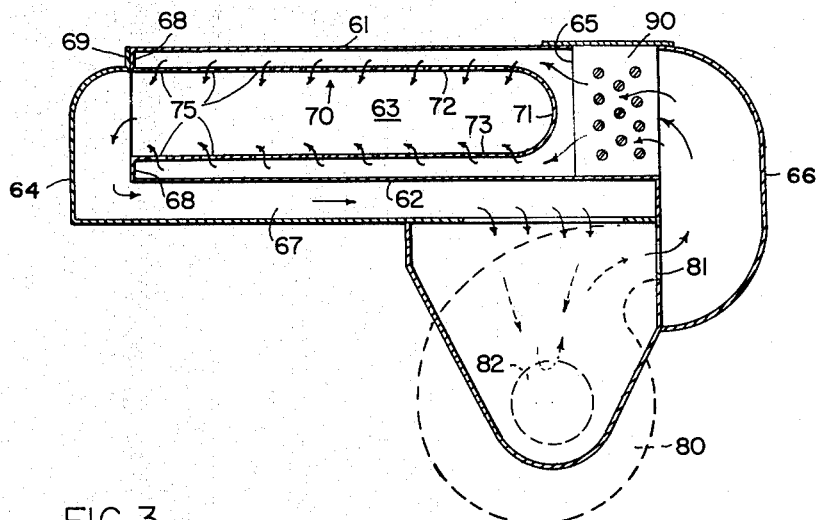
FIG. 3 is a transverse vertical section through the heating tunnel portion of the apparatus.

Turning now to the conveyor 12, its article support comprises four sprocket chains 30, 31, 32 and 33, all located in laterally spaced-apart relation to one another with the chains 32 and 33 arranged in tandem with and disposed between the vertical planes of the chains 30 and 31 (see FIGS. 1 and 2). At the lefthand end of the apparatus 10, the chains 30 and 31 run on sprockets 34 and 35 fixed to a shaft 36 journalled at its opposite ends in a pair of upstanding brackets 37 and 38 fixed to the cross-beam 19; and a pulley 39 is fixed to the shaft 36 in alignment with the pulley 28 on the motor 23 for connection thereto by the drive belt 29. Fixed to the opposite or right-hand cross-beam 19 extending between the extension 20 of the longitudinally extending beams 19 are a pair (one only being visible in FIG. 1) of upstanding brackets 40 in which are journalled the opposite ends of a shaft 41 mounting a pair of sprockets 42. The chains 32 and 33 run over the sprockets 42. A shaft 45, which may have a rounded or circular periphery to be of other configuration and formed with a rounded periphery at its opposite ends, is supported by a pair of upstanding brackets 46 each mounting a fixed block 47 formed with a horizontally disposed slot 48 forming a bearing for one end of the shaft 45. The shaft 45 mounts four sprockets, two laterally outer sprockets 49, 50 and two sprockets 51, 52 located between the sprockets 49, 50. The chains 30, 31 run over the sprockets 49, 50, respectively, and the chains 32, 33 run over the sprockets 51, 52, respectively; and to obviate undue sag, slack take-up rollers 53 and 54 journalled in brackets 55 and 56, respectively, mounted in the frame 11 are provided beneath the lower runs of all four of the chains.

The slotted mounting blocks 47 for supporting the shaft 45 and the rounded ends of the shaft 45 riding in the slots 48 are important features from the standpoint of assembly and operation. In the assembly (reverse in disassembly) of the chains 30, 31, 32 and 33, the shaft 45 may be threaded through the chains and canted fore and aft to fit the ends of the shaft 45 first into the slot 48 in one of the blocks 47 and then into the slot 48 in the other block 47, or simultaneously into opposite ends of the respective slots, the shaft 45 assuming an uncanted position when all of the chains 30, 31, 32 and 33 are connected with their respective sprockets. All of the chains, sprockets 49, 50, 51 and 52 and the shaft 45 may be made of suitable material which is substantially unaffected by heat except for usual expansion according to the nature of the material of which they are formed. It has been found, however, that when the ends of the shaft 45 are journalled in ball or roller bearings, the bearings are quickly rendered inefficient or inoperative by heat and require frequent replacement. The difficulty has been eliminated by forming the shaft 45 with end portions having round peripheries adapted to seat for rotation in the slots 48 of the blocks 47.

The heating tunnel 13 is supported on the upper cross-beams 19 and located to enclose the middle area of the conveyor 12 at and for a considerable distance on opposite sides of the shaft 45. The tunnel 13 comprises three main elements, an outer casing 60, a housing 70 within the casing 60, and a blower 80 communicating with the interior of the casing which forms an air chamber around the housing 70.

The casing 60 is rectangular in shape formed with top and bottom walls 61 and 62, respectively, and partial end and side walls as indicated at 68 which, together with the housing 70, define a tunnel passage 63 therethrough in which the conveyor 12 travels. One side of the casing 60 is closed by a hood 64 communicating with an air outlet port 81 of the blower 80, whereby the hood 64 comprises an air conduit between the air outlet port 81 and an air inlet port 65 of the casing 60. A second hood 66 closes the opposite side of the casing 60 and is formed with a flange 69 by which it is welded or otherwise secured to the flange 68 of the casing 60. A continuation of the hood 66 below and in spaced relation to the lower casing wall 62 provides an air outlet conduit 67 leading to an air inlet port 82 of the blower 80. Thus a completely closed air chamber and conduit structure is provided to communicate with the blower 80.

The housing 70 is confined within the casing 60 in spaced relation to the walls thereof, whereby it may be surrounded by air circulating within the casing, the walls of the housing 70 cooperating with the casing walls to define passageways for the circulating air. Thus, the housing 70 comprises a structure enclosed on three sides by a substantially solid or closed edge or side wall 71 joining with spaced-apart top and bottom walls 72 and 73, respectively, the opposite side or edge of the housing being open and communicating with the second hood 66. The housing 70 is suspended within the casing 60 by having the edges of its top and bottom walls 71 and 72 welded to or otherwise connected to the flanges 68 formed on the casing. The top wall 72 and bottom wall 73 of the housing 70 are formed with apertures 75 which admit air into the tunnel passage 63 from two opposite directions only, whereby the current of air is directed with greatest intensity from two directions toward the median horizontal plane of the passage 63, i.e., toward the top and bottom sides of the conveyor 12.

Located in the casing 60 between the closed edge of the housing 70 and the hood 64 is an electrical resistance heating unit 90, through which air from the blower 80 must pass in its conduct to the apertures 75 in the walls of the housing 70. Suitable thermostat control means is provided so that the heating unit 90 will warm the air to the temperature required for its delivery through the apertures 75 at the maximum intensity predetermined for the particular film in use at the time.

When the apparatus is in use, the blower 80 is operated by a self-contained electric motor to circulate air through the tunnel 13, the circulation being in the directions indicated by the arrows. The motor 23 operates to effect the movement of the conveyor 12 in the direction of the arrow (FIG. 1) to transport a film-wrapped article on the upper run thereof through the tunnel passage 63 at a predetermined speed. Since the sole support for the article is provided by the chains 30, 31, 32 and 33, substantially the entire surface area of the film encasing the article is subjected to the heated air in the passage 63 with, as already stated, the air at its greatest intensity of heat being directed through the apertures 75 against two opposite sides of the film-encased article. The heated air circulates throughout the tunnel passage 63 and thereby applies its heat to all sides of the film-encased article, but at a lesser intensity than that directly applied as it comes through the apertures 75. It is also pointed out that in its transport through the tunnel passage 63 by the conveyor 12, the film-encased article is subjected progressively to the application of heat from its leading to its following end. Thus heat of maximum intensity for the type of film employed is applied to the area of the film toward which the shrinking forces from bi-axial directions tend to concentrate and the film will be brought into intimate contact with all surfaces of the article without danger of being ruptured.

It should be noted that the tunnel 13 is constructed to continuously circulate the same air with a resulting advantage that the temperature of the air may be maintained and controlled efficiently and economically; and it is an important and novel feature of the invention that the heated air is circulated crosswise, i.e., admitted to and withdrawn from the tunnel 13 at its side edges rather than from above than below. In this connection it is pointed out that the total volumetric area of the apertures 75 in the top and bottom walls 72 and 73 and the volumetric areas of the blower outlet and inlet ports 81 and 82, respectively, bear a definite relation to one another whereby the heated air is caused to flow with substantial uniformity through all of the apertures 75 and be circulated entirely across the article being transported by the conveyor 12.

Having thus described my invention, what I claim is:

A method of completely encasing an article in a sheet of heat-shrinkable film of plastic material comprising the steps of
(a) completely and loosely encasing an article in a sealed wrapping of heat-shrinkable film,
(b) moving said loosely wrapped article through an air chamber at a predetermined rate with said loosely wrapped article spaced from the walls of said chamber,
(c) directing heated air into said chamber through the top and bottom thereof so that substantially the entire surface area of the film enwrapping said article is exposed to the currents of heating air in said chamber, (d) applying the air of greatest heat intensity directly against the opposed top and bottom of the film encased article, and (e) applying the air of lesser heat intensity indirectly to the sides of said film enwrapped article, (f) and progressively subjecting the film encased article to the application of said heated air from its leading to its following end whereby said heating air sweeps over said article in a direction generally transversely to its direction of travel through said chamber so that the film shrinks into intimate contact with the article encased therein.

References Cited by the Examiner

UNITED STATES PATENTS

| | | | |
|---|---|---|---|
| 1,801,349 | 4/1931 | Holt | 263—8 |
| 2,308,632 | 1/1943 | Stenberg | 18—48 |
| 2,785,519 | 3/1957 | Rumsey | 53—184 |
| 2,817,506 | 12/1957 | Albright | 263—8 |
| 2,906,627 | 9/1959 | Payton | 53—30 X |
| 2,968,067 | 1/1961 | Long | 18—48 |
| 3,014,320 | 12/1961 | Harrison | 53—30 X |
| 3,093,448 | 6/1963 | Kirkpatrick et al. | |

WILLIAM F. O'DEA, *Primary Examiner.*

FREDERICK KETTERER, CHARLES O'CONNELL, NORMAN YUDKOFF, *Examiners.*